United States Patent [19]

Wachi

[11] Patent Number: 5,224,086
[45] Date of Patent: Jun. 29, 1993

[54] SPINDLE SERVO SYSTEM FOR MAGNETO-OPTICAL RECORDING/PLAYBACK APPARATUS

[75] Inventor: Shigeaki Wachi, Tokyo, Japan
[73] Assignee: Sony Corporation, Tokyo, Japan
[21] Appl. No.: 728,162
[22] Filed: Jul. 10, 1991

[30] Foreign Application Priority Data

Jul. 17, 1990 [JP] Japan .................. 2-187192

[51] Int. Cl.⁵ .............................................. G11B 7/00
[52] U.S. Cl. ...................................... 369/50; 369/47; 369/54; 369/44.11
[58] Field of Search ........................ 369/50, 54, 53, 58, 369/44.11, 47, 13, 44.38, 110, 116, 48, 111, 32, 124, 48; 360/27

[56] References Cited

U.S. PATENT DOCUMENTS

| | | | |
|---|---|---|---|
| 4,823,203 | 4/1989 | Narusawa | 369/58 |
| 5,056,075 | 10/1991 | Maruta et al. | 369/47 |
| 5,058,089 | 10/1991 | Yoshimaru et al. | 369/47 |
| 5,062,091 | 10/1991 | Maeda et al. | 369/47 |

*Primary Examiner*—Aristotelis Psitos
*Assistant Examiner*—Muhammad N. Edun
*Attorney, Agent, or Firm*—Philip M. Shaw, Jr.

[57] ABSTRACT

A spindle servo system for a magneto-optical recording/playback apparatus, comprising a PLL circuit lockable in phase by sample servo pits formed on a track of a magneto-optical disc; a phase comparator for comparing the phase of a signal, whose period corresponds to the output of the PLL circuit, with the phase of a reference frequency signal; and a resonator having a reference frequency conforming to the eccentricity cycle of the disc. In this servo system, the rotation period of a spindle motor for driving the disc is controlled in accordance with the output of the phase comparator and the output of the resonator. The PLL circuit includes a voltage-controlled crystal oscillator, and the resonator is excited in conformity to the output of the phase comparator to control the rotation frequency of the spindle motor, thereby reducing the jitter component included in the output of the PLL circuit.

7 Claims, 5 Drawing Sheets

SPINDLE SERVO SYSTEM FOR MAGNETO-OPTICAL RECORDING/PLAYBACK APPARATUS

BACKGROUND OF THE INVENTION

1. Field of the Invention

The present invention relates to a spindle motor servo system adapted for use in rotating a magneto-optical disc, where sample servo pits are formed, at a predetermined angular velocity in a magneto-optical recording/playback apparatus.

2. Description of the Prior Art

In recording desired data on a magneto-optical disc and reproducing the recorded data therefrom, the known techniques are generally classified into a method of sequentially recording the data on a continuous track, and another method of recording the data in accordance with servo pits formed previously at predetermined positions of a track on the disc.

FIG. 4A illustrates one surface of a magneto-optical disc to be recorded by the method of previously forming a plurality of sample servo pits P in each of sectors defined by circumferential division of the recording disc surface, and then detecting such sample servo pits P to produce various servo signals inclusive of a focus servo signal, a tracking servo signal and so forth for the magneto-optical disc. The sample servo pits P are arranged radially on the disc.

FIG. 4B is an enlarged view of an arrangement of sample pits P which comprise warbling pits P1, P2 for detecting a tracking error, and clock pits P3 for detecting a clock signal.

The clock pits P3 are detected as samples in a state where the magneto-optical disc is so driven that the rotation angle thereof is maintained constant, whereby the clock signal can be detected from reproduced RF data.

FIG. 5 shows a conventional spindle servo circuit for rotating the above-described disc D. In this example, the disc D is chucked by the rotary shaft of a spindle motor M and is driven to rotate together with an FG generator which detects the rotation rate.

Rotation pulses outputted from the FG generator F are supplied to a phase comparator 1 and then are compared with a signal obtained by demultiplying a reference signal of a crystal oscillator 2 by means of a frequency divider 3. The result of such comparison is fed to a low-pass filter 4 so that a phase difference error signal is formed. Meanwhile the output pulses of the FG generator F are supplied also to a frequency-to-voltage converter 5 to thereby detect the rotation frequency of the spindle motor via the comparator 6. Subsequently the rotation frequency signal is supplied to an adder 7 together with the phase difference error signal, and then the output of the adder 7 is supplied via a phase compensator 8 and a driver 9 to the spindle motor M.

According to such spindle servo circuit where the spindle motor M is rotated in synchronism with the signal of a predetermined period outputted from the crystal oscillator 2, an unshown fixed clock signal is reproduced from the magneto-optical disc D if the division ratio of the frequency divider 3 is set to a given value, so that data recording and reproducing operations can be performed in conformity with such clock signal.

However, in case the magneto-optical disc D is rendered eccentric due to any chucking deviation or when the track of the disc itself fails to be completely circular, it follows that some jitter is induced in the reproduced clock signal even if the spindle motor M is so controlled that its rotation rate is maintained constant. In relation to the eccentricity r1 based on the disc and the eccentricity r2 based on the chucking deviation, the amplitude of the jitter is expressed as $$2(\Delta r1 + \Delta r2)/j\omega \text{ (where } \omega = 2\pi f\text{)}$$

And the frequency deviation with respect to the rotation frequency f of the disc is expressed as $$f = (\Delta r1 + \Delta r2)/j\pi$$

In an ordinary disc chucking device, the frequency deviation f occasionally reaches 0.1 percent or so which is a non-trivial jitter component.

Therefore the clock reproducing circuit for the magneto-optical disc is equipped with a PLL (phase-locked loop) circuit synchronizable with the clock signal so as to absorb the jitter component. However, if there is employed such a PLL circuit that the capture range is narrow to stabilize the center frequency thereof, it becomes difficult to lock the PLL circuit in compliance with the jitter, hence raising a problem that a stable clock signal is not attainable.

OBJECT AND SUMMARY OF THE INVENTION

It is an object of the present invention to provide an improved spindle servo system for minimizing a jitter component in a clock signal with a simplified circuit configuration in a magneto-optical recording/playback apparatus.

According to one aspect of the present invention, there is provided a spindle servo system comprising a PLL circuit lockable in phase by sample servo pits formed on a track of a magneto-optical disc; a phase comparator for comparing the phase of a signal, whose period corresponds to the output of the PLL circuit, with the phase of a reference signal; and a resonator conforming to the eccentricity cycle of the magneto-optical disc. In this servo system, the rotation period of a spindle motor for driving the magneto-optical disc is controlled in accordance with the output of the phase comparator and the output of the resonator. Thus, the rotation of the spindle motor can be controlled in such a manner as to absorb any chucking deviation relative to the magneto-optical disc and also the jitter caused by the eccentricity of the disc, hence simplifying the configuration of the PLL circuit to produce a clock signal for the disc and further stabilizing the operation of the circuit. And due to such spindle servo control, the period of the clock signal is rendered stable with facility.

The above and other features and advantages of the present invention will become apparent from the following description which will be given with reference to the illustrative accompanying drawings.

DESCRIPTION OF THE PREFERRED EMBODIMENTS

Hereinafter preferred embodiments of the present invention will be described in detail with reference to the accompanying drawings.

Figure 1:
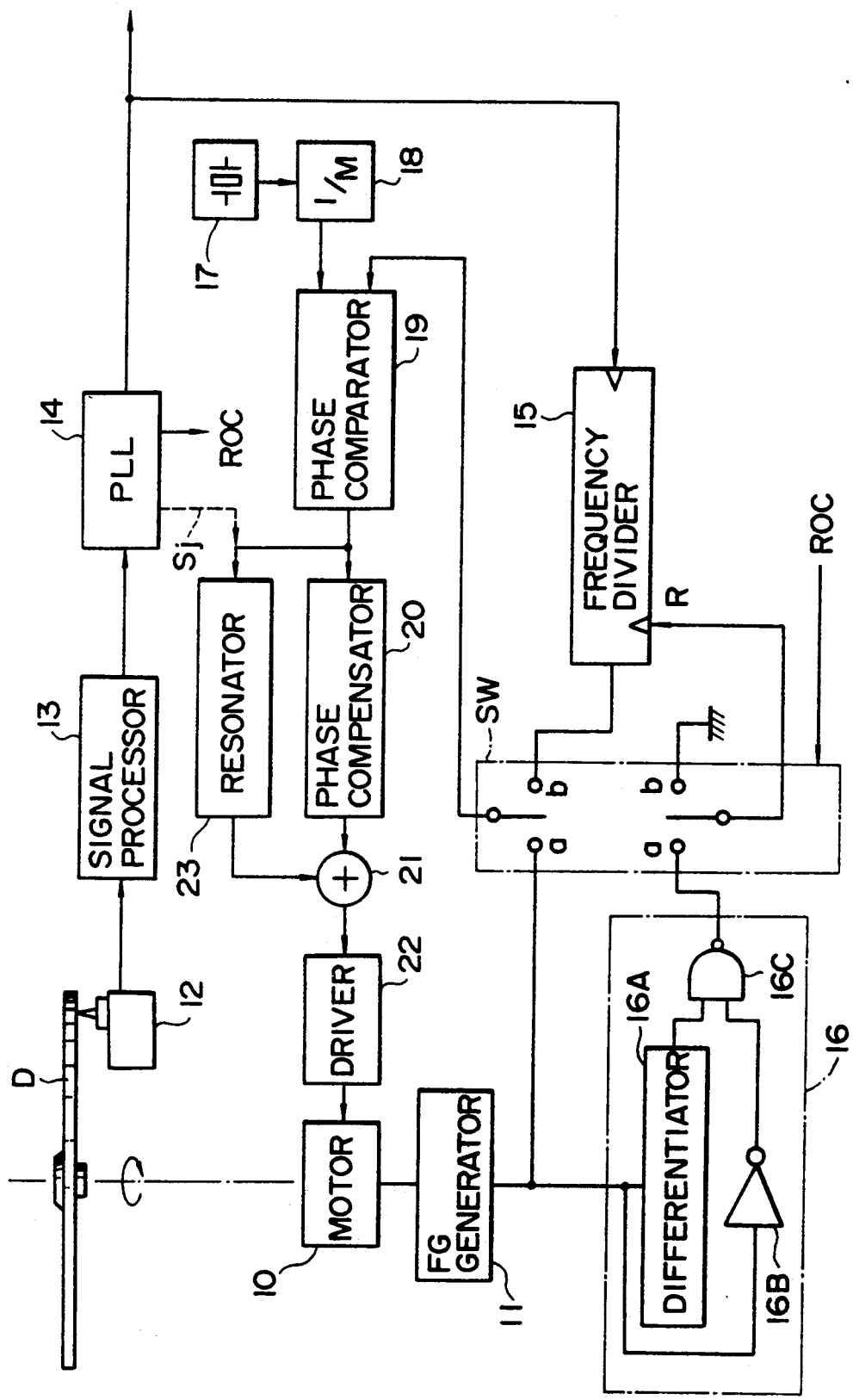
FIG. 1 is a block diagram of a spindle servo system embodying the present invention.

FIG. 1 shows an exemplary spindle motor servo circuit according to the present invention, wherein a magneto-optical disc D to be controlled with respect to the rotation thereof is driven by a spindle motor 10 and an FG generator 11. Denoted by 12 is an optical head capable of recording data on the disc D and reproducing the recorded data therefrom. The data reproduced by the optical head 12 is supplied to a signal processor 13. As is known well, the signal processor 13 detects sample servo pits out of an RF signal and supplies the aforementioned clock pits to a PLL circuit 14 in the next stage. And the output of the PLL circuit 14 is supplied to a resettable frequency divider 15. This frequency divider 15 may be replaced with a counter as well.

Meanwhile an FG signal outputted from the FG generator 11, inclusive of the rotation frequency information, is supplied to an edge detector 16 (which will be described in grater detail hereinafter, and, when a movable contact of an, undermentioned switch circuit SW is connected to one of two stationary contacts a, the FG signal is used to one of two stationary contacts a, the FG signal is used to reset the frequency divider 15. The output of the FG generator 11 is supplied also to one input terminal of a frequency-phase comparator 19 via the switch circuit SW when the switch circuit SW is connected to the other stationary contact a. An output signal of a reference oscillator 17 composed of a crystal or the like is demultiplied by a frequency divider 18 and then is inputted to the other terminal of the frequency-phase comparator 19, where the frequency-phase difference between the reference signal and the output signal of the FG generator 11 is detected and supplied to a phase compensator 20. The output of the phase compensator 20 supplied as a control signal for the spindle motor 10 via an adder 21 and a driver 22.

Denoted by 23 is a resonator representing the feature of the present invention. The resonator 23 is set to a resonance frequency corresponding to the eccentricity frequency of the magneto-optical disc.

Now a description will be given on the spindle servo system of the present invention for a magneto-optical disc having sample servo pits.

In response to arrival at a steady state of the spindle motor 10 for rotating the disc D, the pulse signal of the rotation frequency outputted from the FG generator 11 is supplied via the contact a of the switch circuit SW to the frequency-phase comparator 19 so as to be compared, in regard to both the frequency and the phase, with the output signal of the frequency divider 18 inputted to the other terminal of the comparator 19. Thereafter the output, of the frequency-phase comparator 19 is supplied via the phase compensator 20, the adder 21 and the driver 22 to the spindle motor 10, so that the spindle motor 10 is rotated at the given frequency preset by the reference oscillator 17.

The sample servo pits outputted in such rotation period are reproduced by the optical head 12, and the clock pits detected from the reproduced sample servo pits are inputted via the signal processor 13 to the PLL circuit 14.

Meanwhile the output signal of the FG generator 11 is supplied also to the edge detector 16 which consists of a differentiator 16A, an inverter 16B and a NAND gate 16C. The output signal of the FG generator is supplied to the inputs of the differentiator 16A and the inverter 16B. The outputs of the differentiator 16A and the inverter 16B are supplied to the separate inputs of the NAND gate 16C whose output is supplied to one of the stationary contacts a of the switch SW. and the frequency divider 15 is reset by an edge pulse signal outputted from the edge detector 16, so that a phase coincidence is attained under control between the output of the frequency divider 15 and the output of the FG generator 11.

When the PLL circuit 14 is placed in a synchronized state under control of the reproduced clock pits, a lock signal ROC is outputted to change the switch circuit SW to its contacts b, and then the output of the FG generator 11 is disconnected from the spindle servo circuit of the present invention. However, since the output of the frequency divider 15 is now supplied to the frequency-phase comparator 19 through a contact b of the switch circuit SW, a spindle servo action is performed in such a manner that the period of the clock signal outputted from the PLL circuit 14 is rendered coincident with the reference period preset by the reference oscillator 17. More specifically, when the PLL circuit 14 has been locked in phase, the spindle servo action is selectively switched so that the period of the clock pits reproduced from the magneto-optical disc becomes coincident with the reference period. Consequently, upon the occurrence of any jitter in the reproduced clock signal due to some eccentricity or the like of the disc, the spindle motor 10 is controlled in the direction to eliminate such jitter.

Particularly in the spindle servo system of the present invention, the resonator 23 having a resonance frequency conforming to the eccentricity cycle of the magneto-optical disc is connected to the output terminal of the frequency-phase comparator 19, and the output signal thereof is supplied via the adder 21 to the driver 22. Therefore the resonator 23 is excited by the frequency-phase comparator 19 which outputs the jitter components, and the resonator output serves to forcibly control the rotation rate of the spindle motor 10 within one rotation. Consequently it is possible to achieve a remarkable effect of positively suppressing the jitter of the clock pits reproduced by the optical head 12.

According to the present invention, even in a fixed rotation angle type spindle servo circuit, the rotation of the spindle motor 10 is forcibly controlled by the resonator 23 in the direction to eliminate the jitter component, so that a voltage-controlled crystal oscillator VCXO with a stable center frequency can be employed as an oscillator VCO constituting the PLL circuit 14. Thus, a superior advantage is attainable by a control operation so performed as not to place the PLL circuit with such oscillator VCXO in a state out of synchronism.

Figure 2:
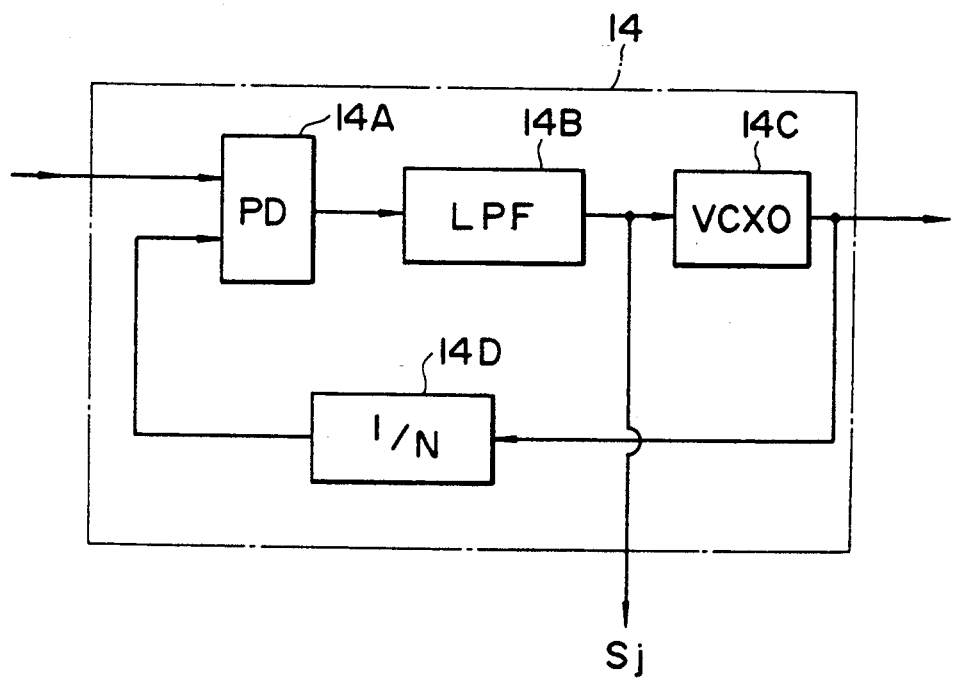
FIG. 2 is a block/diagram of an exemplary configuration of a phase-locked loop circuit.

FIG. 2 is an exemplary block diagram of the above-described PLL circuit with a VCXO, comprising a phase comparator 14A, a low-pass filter 14B, a variable frequency type voltage-controlled oscillator (VCXO) using a crystal as an oscillation element, and a frequency divider 14D.

The output of the low-pass filter 14B can be obtained as a signal Sj including a jitter component so that, as represented by a dotted line in FIG. 1, the signal Sj may be used to drive the resonator 23.

Figure 3:
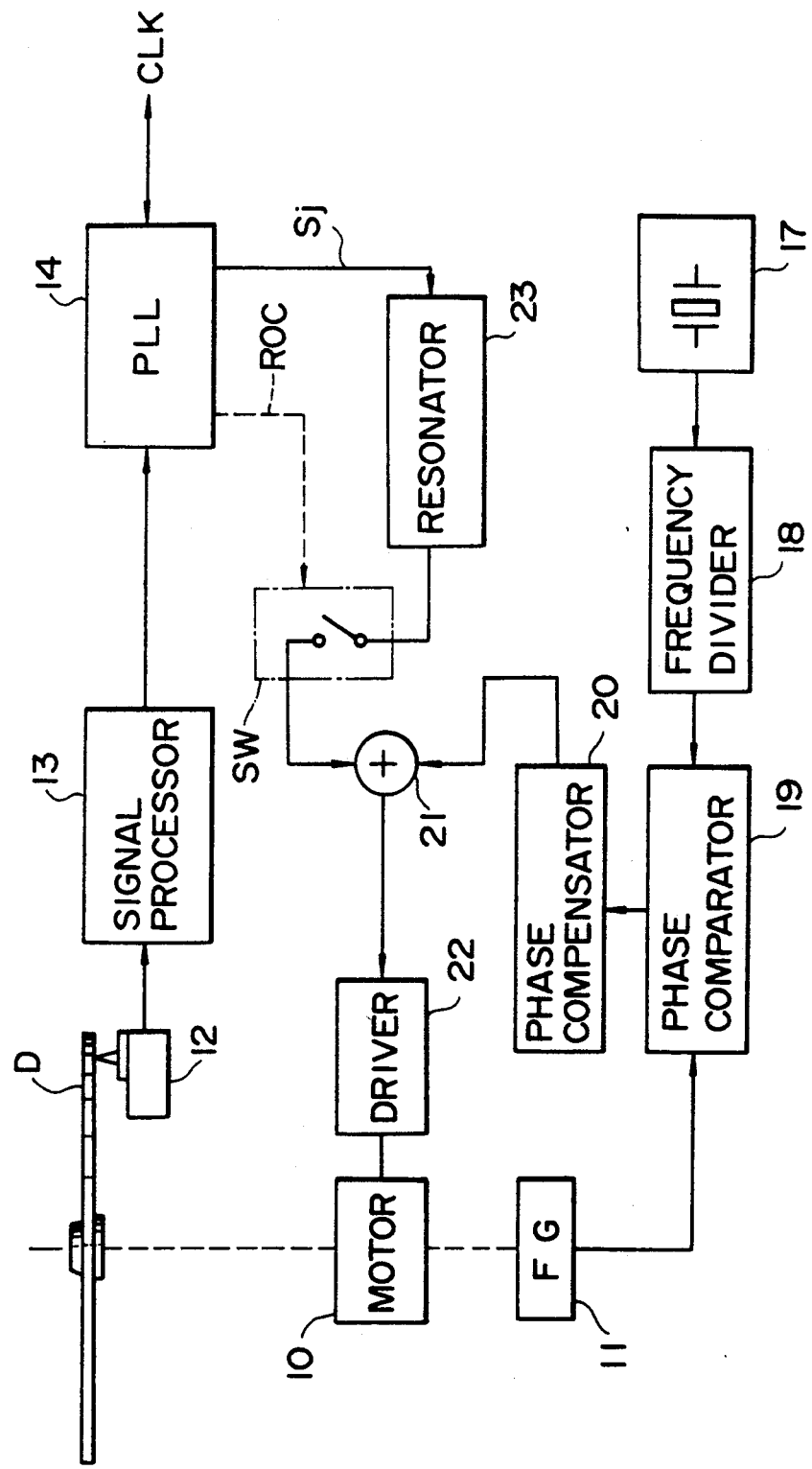
FIG. 3 is a block diagram of another embodiment of the present invention.
Figure 4A:
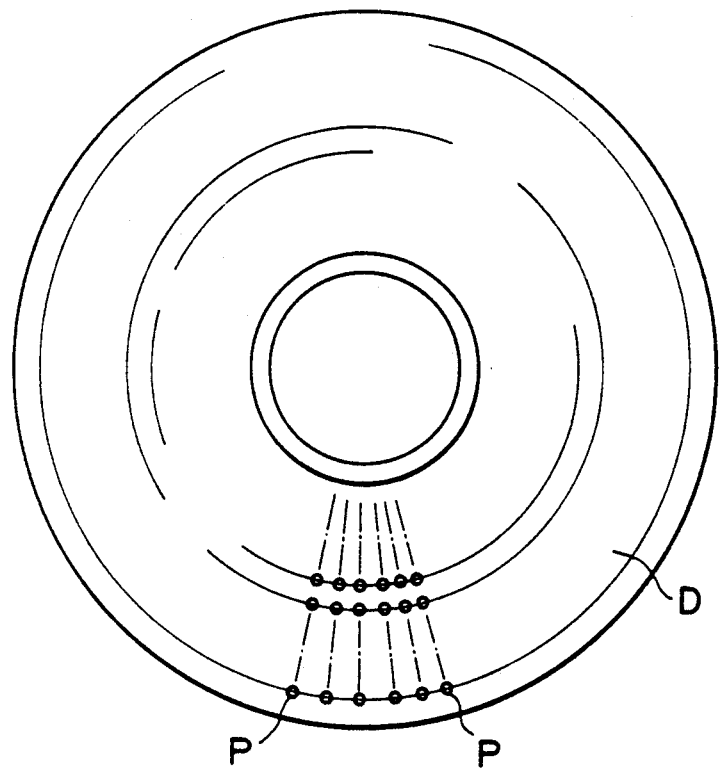
FIGS. 4A and 4B illustrate a conventional magneto-optical disc with sample servo pits.
Figure 4B:
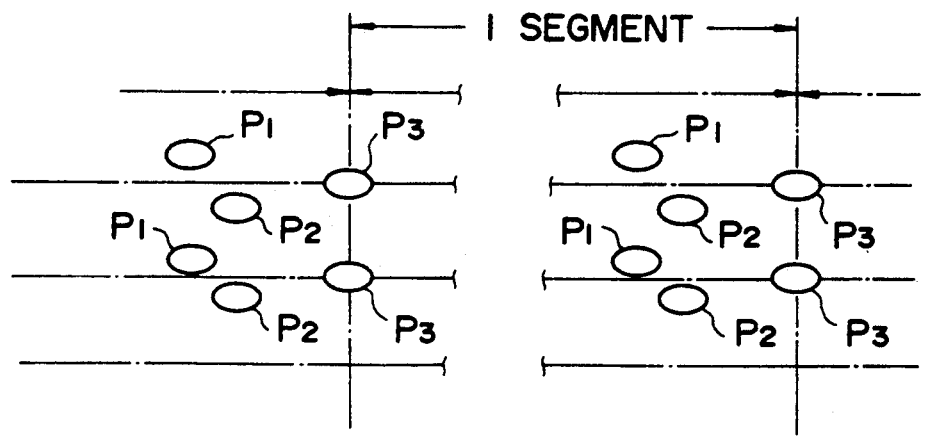
Figure 5:
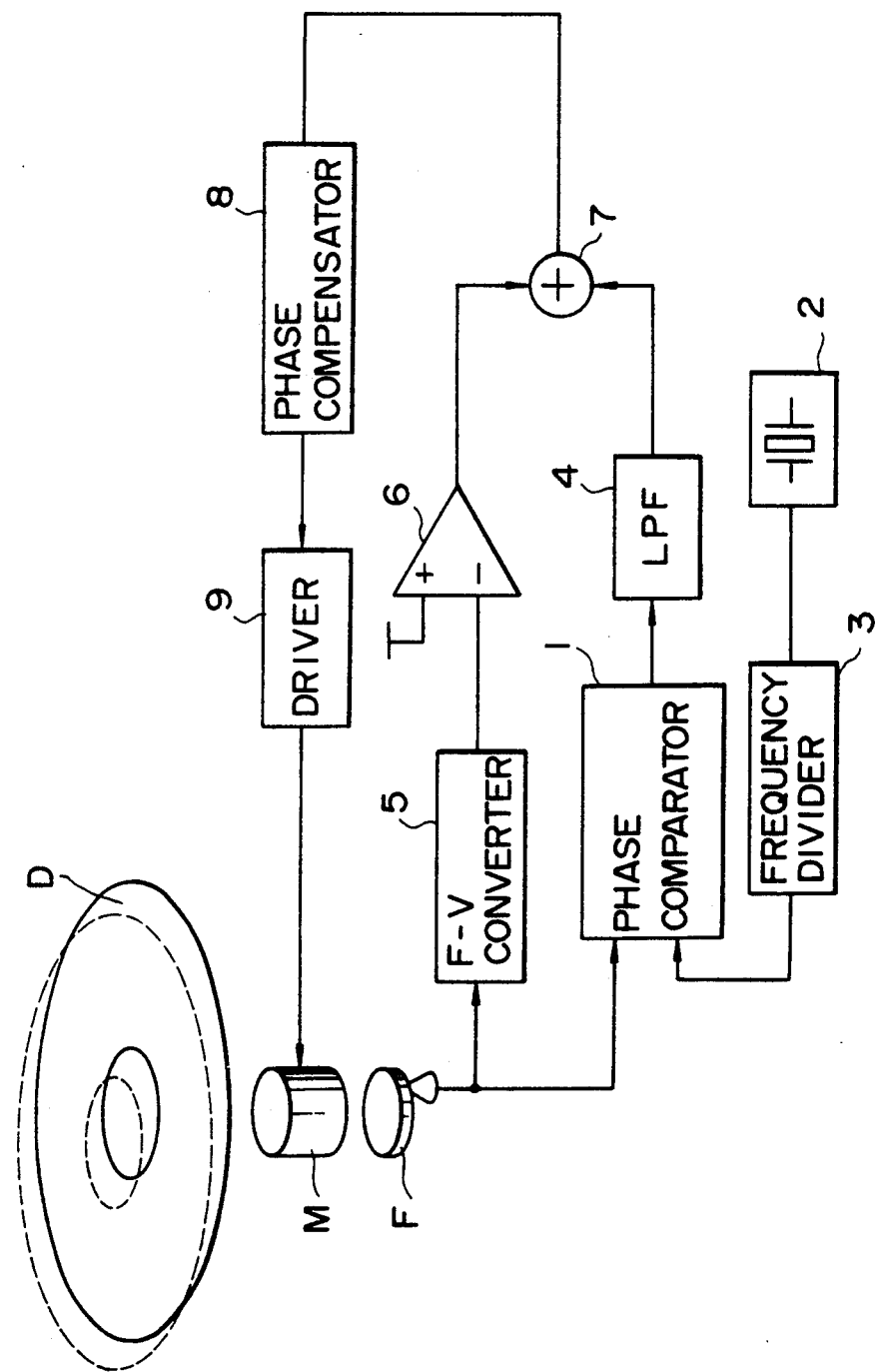
FIG. 5 is a circuit diagram of a conventional spindle servo system.

FIG. 3 is a block diagram of another embodiment of the present invention, in which any circuit components corresponding to those shown in FIG. 1 are denoted by the same reference numerals and symbols.

In this embodiment, the switch circuit SW included in FIG. 1 is omitted, and the output of an FG generator 11 is compared with a reference signal by a frequency-phase comparator 19 even after a PLL circuit 14 is locked in phase, thereby controlling the rotation of a spindle motor 10. However, in such a locked state, a switch circuit SW in FIG. 3 is turned on by a lock signal ROC outputted from the PLL circuit 14, so that the output of a resonator 23 is supplied via an adder 21 to the spindle motor 10. The resonator 23 is excited in conformity to the output of the phase comparator constituting the PLL circuit 14, i.e., to the eccentricity cycle of the magneto-optical disc corresponding to the jitter component Sj. Therefore, in this spindle servo circuit, the rotation frequency of the spindle motor 10 is so controlled as to reduce the jitter component in the clock signal outputted from the PLL circuit 14.

As described hereinabove, according to the spindle servo system of the present invention, the spindle motor 10 is controlled by the output of the resonator excited in conformity to the eccentricity cycle of the magneto-optical disc, so that the jitter component included in the reproduced clock signal can be minimized. Furthermore, due to such reduction of the jitter in the clock signal outputted from the PLL circuit, there is achieved another remarkable effect that a low-cost VCXO type IC can be employed as the PLL circuit to consequently simplify the circuit configuration.

What is claimed is:

1. A spindle servo system for a magneto-optical recording/playback apparatus, comprising:
    a magneto-optical disc reading circuit for generating a first signal corresponding to sample servo pits formed on a track of a magneto-optical disc, the first signal having a jitter component caused by an eccentricity of the magneto-optical disc;
    a phase-locked loop circuit supplied with the first signal and lockable in phase to the magneto-optical disc reading circuit's output;
    a first phase comparator for comparing the phase of a second signal, whose period corresponds to the output of the phase-locked loop circuit, with the phase of a reference frequency signal and outputting a third signal;
    a resonator supplied with a signal corresponding to the jitter component of the first signal, having a resonance frequency conforming to the eccentricity of the magneto-optical disc, and outputting a fourth signal; and
    a motor drive circuit responsive to the third signal and the fourth signal for controlling the rotation period of a spindle motor;
    wherein the rotation period of the spindle motor for driving the magneto-optical disc is controlled by the motor driver circuit in accordance with the output of the first phase comparator and the output of the resonator.

2. A spindle servo system according to claim 1, wherein the phase-locked loop circuit includes a voltage-controlled crystal oscillator.

3. A spindle servo system according to claim 1, wherein the resonator is excited in conformity to the output of the phase comparator to control the rotation frequency of the spindle motor, thereby reducing a jitter component included in the output of the phase-locked loop circuit.

4. A spindle servo system according to claim 1, wherein the first phase comparator further includes a phase compensator.

5. A spindle servo system according to claim 1, wherein the phase-locked loop circuit comprises a second phase comparator supplied at one input with the first signal, a low-pass filter connected to an output of the second phase comparator, a variable frequency type voltage-controlled oscillator controlled by an output of the low-pass filter, and a frequency divider supplied with an output of the voltage-controlled oscillator and outputting a divided frequency signal to another input of the second phase comparator.

6. A spindle servo system according to claim 5, wherein the signal corresponding to the jitter component of the low-pass filter.

7. A spindle servo system according to claim 1, wherein the signal corresponding to the jitter component which is supplied to the resonator is the output of the first phase comparator.

* * * * *